UNITED STATES PATENT OFFICE.

FRANZ STOHR, OF VIENNA, AUSTRIA.

PROCESS OF MANUFACTURING FERRUGINOUS PREPARATIONS.

1,393,049. Specification of Letters Patent. Patented Oct. 11, 1921.

No Drawing. Application filed March 3, 1921. Serial No. 449,518.

*To all whom it may concern:*

Be it known that I, Dr. FRANZ STOHR, a citizen of the Republic of Austria, and a resident of Vienna, Austria, have invented certain new and useful Improvements in a Process of Manufacturing Ferruginous Preparations, of which the following is a specification.

In Austrian Patent #57394, for facilitating the assimilation of iron in the preparation, and for increasing the wholesomeness thereof, it has been proposed to manufacture a ferruginous preparation in the following manner: Milk is condensed by adding from 3 to 8% of lactose or other reducing sugar, such as dextrous or maltose, and cane sugar, (35 to 40%), until the consistency of ordinary milk is attained; any of the commercial ferrisaccharates of almost neutral, but in any case, slightly acid reaction is added; the mixture is then heated in a vacuum to a temperature of from about 90 to 100° centigrade, and maintained at this temperature for from one to one and one-half hours, whereby the ferrisaccharate is converted into ferrous compounds, which are soluble in the cane sugar solution.

Under the present invention, invert sugar in substituted for the major part of the cane sugar used in the old process above described, as a result of which the stability of the ferrous compound is increased, its ability to oxidize decreased and a still higher wholesomeness, especially for infants, is imparted to the preparation. To prevent the formation of any acid from the ferrisaccharate or invert sugar, which might prove detrimental to the milk, the mixture of condensed milk and ferrisaccharate is completely neutralized or made slightly alkaline before heating in a vacuum by the addition of alkali hydroxids or carbonates.

To the solution of ferrous salts in condensed milk, obtained by the above described heating process, other medicinal substances may be added or not, as desired. The preparation may then be converted into dry milk in any known manner after the addition of a further quantity of milk, care being taken, however, to keep the temperature as low as possible.

Claims—

1. A process for manufacturing a ferruginous preparation consisting: in adding to milk a reducing agent, cane sugar, and invert sugar in a larger quantity than cane sugar, in then adding to the mixture commercial ferrisaccharate and an alkali compound of alkaline reaction, whereby any acid reaction of the mixture is removed, and in then heating the mixture in a vacuum, whereby the liquid is evaporated until the desired consistency of the preparation is attained, substantially as described herein.

2. A process for manufacturing a ferruginous preparation consisting: in adding to milk a reducing sugar, cane sugar and invert sugar in a larger quantity than cane sugar, in then adding to the mixture commercial ferrisaccharate, and an alkali compound of alkaline reaction, whereby any acid reaction of the mixture is removed, and in then heating the mixture in a vacuum, whereby the liquid is evaporated, and in then adding to the mixture so condensed, a further quantity of milk, and thereupon evaporating the whole in a vacuum to dryness, substantially as described herein.

3. A process for manufacturing a ferruginous preparation consisting: in adding to milk a reducing agent, cane sugar and invert sugar in a larger quantity than cane sugar, and then adding to the mixture commercial ferrisaccharate and an alkali compound of alkaline reaction, whereby any acid reaction of the mixture is removed, and in then heating the mixture in a vacuum, whereby the liquid is evaporated, and in then adding to the mixture, so condensed, a further quantity of milk and medicinal substances and thereupon evaporating the whole in a vacuum to dryness, substantially as described herein.

In testimony whereof I have signed my name to this specification, in the presence of two subscribing witnesses.

Dr. FRANZ STOHR.

Witnesses:
ARTHUR BAUMANN,
LUDWIG SOIDA.